(12) United States Patent
Brown

(10) Patent No.: US 7,862,720 B2
(45) Date of Patent: Jan. 4, 2011

(54) PORTABLE FILTRATION SYSTEM

(75) Inventor: Dennis Brown, Logan, UT (US)

(73) Assignee: Aquamira Technologies, Inc., Logan, UT (US)

( * ) Notice: Subject to any disclaimer, the term of this patent is extended or adjusted under 35 U.S.C. 154(b) by 0 days.

(21) Appl. No.: 11/463,589

(22) Filed: Aug. 9, 2006

(65) Prior Publication Data

US 2008/0035553 A1  Feb. 14, 2008

(51) Int. Cl.
- *B01D 29/88* (2006.01)
- *B01D 35/02* (2006.01)
- B01D 29/00 (2006.01)
- B01D 35/00 (2006.01)

(52) U.S. Cl. .................. 210/335; 210/464; 210/466; 210/470; 210/473; 210/446; 210/418; 210/460

(58) Field of Classification Search .................. None
See application file for complete search history.

(56) References Cited

U.S. PATENT DOCUMENTS

| | | | |
|---|---|---|---|
| 1,205,743 A | | 11/1916 | Didcott |
| 2,670,081 A | * | 2/1954 | Quinn .................. 210/316 |
| 4,529,511 A | * | 7/1985 | Breeden et al. ............ 210/94 |
| 4,695,379 A | | 9/1987 | Nohren, Jr. et al. |
| 4,769,052 A | | 9/1988 | Kowalski |
| 4,877,521 A | | 10/1989 | Petrucci et al. |
| 4,881,313 A | | 11/1989 | Artinyan et al. |
| 4,882,061 A | | 11/1989 | Petrucci et al. |
| 4,915,831 A | | 4/1990 | Taylor |
| 4,948,505 A | | 8/1990 | Petrucci et al. |
| 4,979,654 A | | 12/1990 | Nohren, Jr. |
| 4,983,267 A | | 1/1991 | Moeglich et al. |
| 4,986,901 A | | 1/1991 | Nohren, Jr. et al. |
| 5,045,195 A | | 9/1991 | Spangrud et al. |

(Continued)

FOREIGN PATENT DOCUMENTS

WO     WO 0009240 A3     2/2000

(Continued)

OTHER PUBLICATIONS

Web pages, http://www.aquamira.com/military/aquamira-fronter-filter, illustrating product publicly available at least as early as Aug. 8, 2006.

(Continued)

*Primary Examiner*—Krishnan S Menon
*Assistant Examiner*—Madeline Gonzalez
(74) *Attorney, Agent, or Firm*—Holme Roberts & Owen LLP

(57) ABSTRACT

A portable filter and filter system. The filter has a filter housing defining a liquid channel from an inlet to an outlet. The portable filter includes a liquid filter located in the filter housing, a mouthpiece mechanically associated with the dispensing end of the filter housing, and a liquid receiving means connected to the receiving end of the filter housing. The device can include a pre-filter assembly of which the liquid receiving means is a part. The liquid receiving means can include multiple connection members to receive liquid from a variety of liquid sources. The filter can be combined with a liquid container to form a portable filter system. The container can be a flexible bladder having a strap to connect the filtration device to the bladder.

20 Claims, 10 Drawing Sheets

U.S. PATENT DOCUMENTS

| | | | |
|---|---|---|---|
| 5,122,272 | A | 6/1992 | Iana et al. |
| 5,126,043 | A | 6/1992 | Giordano et al. |
| 5,130,015 | A * | 7/1992 | Simizu et al. ............... 210/136 |
| 5,139,666 | A | 8/1992 | Charbonneau et al. |
| 5,151,180 | A | 9/1992 | Giodano et al. |
| 5,173,192 | A * | 12/1992 | Shalev ..................... 210/767 |
| 5,211,973 | A | 5/1993 | Nohren, Jr. |
| 5,221,483 | A * | 6/1993 | Glenn et al. ............... 210/641 |
| 5,273,649 | A * | 12/1993 | Magnusson et al. ......... 210/232 |
| 5,609,759 | A | 3/1997 | Nohren, Jr. et al. |
| 5,635,079 | A | 6/1997 | Becking, II |
| 5,653,878 | A | 8/1997 | Reid |
| 5,674,391 | A | 10/1997 | Nohren, Jr. |
| 5,681,463 | A | 10/1997 | Shimizu et al. |
| D391,448 | S * | 3/1998 | Winer et al. ............... D7/510 |
| 5,840,185 | A | 11/1998 | Hughes et al. |
| 5,914,045 | A | 6/1999 | Palmer et al. |
| 5,928,512 | A | 7/1999 | Hatch et al. |
| 6,004,460 | A | 12/1999 | Palmer et al. |
| 6,024,012 | A | 2/2000 | Luzenberg, Jr. |
| 6,058,971 | A | 5/2000 | Palmer et al. |
| 6,117,319 | A * | 9/2000 | Cranshaw ................... 210/232 |
| 6,136,188 | A * | 10/2000 | Rajan et al. ................ 210/244 |
| 6,136,189 | A | 10/2000 | Smith et al. |
| 6,153,096 | A | 11/2000 | Nonren, Jr. |
| 6,165,362 | A | 12/2000 | Nohren, Jr. et al. |
| 6,193,886 | B1 | 2/2001 | Nohren, Jr. |
| 6,200,471 | B1 | 3/2001 | Nohren, Jr. |
| 6,221,416 | B1 | 4/2001 | Nohren, Jr. |
| 6,267,887 | B1 | 7/2001 | Hughes et al. |
| 6,277,284 | B1 | 8/2001 | Nohren |
| 6,325,929 | B1 | 12/2001 | Bassett |
| 6,344,146 | B1 * | 2/2002 | Moorehead et al. ......... 210/668 |
| 6,354,344 | B1 | 3/2002 | Pluta et al. |
| 6,395,170 | B1 | 5/2002 | Hughes et al. |
| 6,458,269 | B1 | 10/2002 | Bassett et al. |
| 6,468,435 | B1 | 10/2002 | Hughes et al. |
| 6,506,449 | B2 | 1/2003 | Mierau et al. |
| 6,523,711 | B1 | 2/2003 | Hughes et al. |
| 6,561,234 | B2 | 5/2003 | Pluta et al. |
| 6,565,743 | B1 * | 5/2003 | Poirier et al. ................ 210/85 |
| 6,569,329 | B1 | 5/2003 | Nohren, Jr. |
| 6,599,427 | B2 | 7/2003 | Nohren et al. |
| 6,602,406 | B1 | 8/2003 | Nohren et al. |
| 6,733,669 | B1 | 5/2004 | Crick |
| 6,800,200 | B2 | 10/2004 | Bassett et al. |
| 6,875,350 | B2 * | 4/2005 | Allard ..................... 210/209 |
| 6,919,025 | B2 * | 7/2005 | Cluff et al. ................. 210/244 |
| 2002/0020673 | A1 | 2/2002 | Nohren et al. |
| 2002/0060176 | A1 | 5/2002 | Mierau et al. |
| 2002/0108901 | A1 | 8/2002 | Mierau et al. |
| 2003/0164333 | A1 | 9/2003 | Nohren, Jr. et al. |
| 2003/0168401 | A1 | 9/2003 | Koslow |
| 2004/0206682 | A1 | 10/2004 | Hamlin et al. |
| 2004/0222145 | A1 | 11/2004 | Onoue et al. |
| 2005/0029265 | A1 * | 2/2005 | Morgan et al. ........... 220/254.9 |
| 2005/0035041 | A1 | 2/2005 | Nohren, Jr. et al. |
| 2005/0139540 | A1 | 6/2005 | Mierau et al. |
| 2005/0173319 | A1 | 8/2005 | Fritze et al. |
| 2005/0252844 | A1 * | 11/2005 | Chau ..................... 210/282 |
| 2006/0157398 | A1 | 7/2006 | Nohren |

FOREIGN PATENT DOCUMENTS

WO    WO 2005007066  A2    1/2005

OTHER PUBLICATIONS

Web pages, http://www.aquamira.com/comsumer/aquamira-water-bottle-and-filter, illustrating product publicly available as early as Aug. 8, 2006.

* cited by examiner

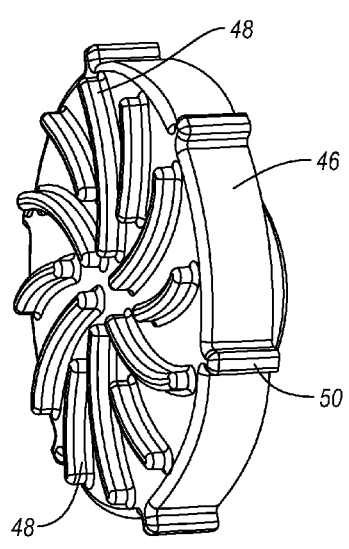
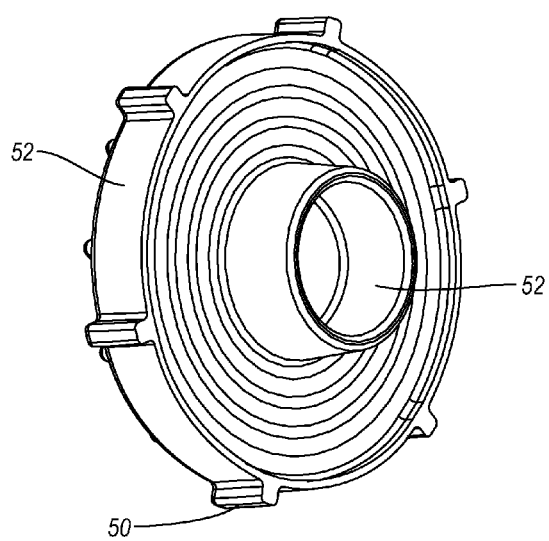
*Fig. 7A*
*Fig. 7B*

PORTABLE FILTRATION SYSTEM

BACKGROUND OF THE INVENTION

1. The Field of the Invention

The present invention relates to the field of liquid filtration for consumption. More particularly, the invention relates to the field of small portable water filers and systems.

2. The Relevant Technology

There is a consistent need to take liquids, particularly water, into the body. While humans are often close to plentiful supplies of potable water, this is not always the case. For example, persons in the military, outdoor enthusiasts, or persons in emergency circumstance may find themselves without access to potable water. To fill this need, there are a wide variety of filtration and chemical treatment systems available to treat water of questionable cleanliness and render it suitable for human consumption. Systems using carbon filtration or chemical treatment with chlorine or iodine are well known in the art.

For example, Aquamira Technologies Inc. of Bellingham, Wash. sells a Water Bottle and Filter System that incorporates a solid activated carbon filter into the cap of the water bottle so that as a user suctions water through the bottle cap, the water is filtered through the carbon filter in the lid before it is consumed by the user. As another example, Aquamira Corp. of Bellingham, Wash. sells the Frontier Emergency Water Filter System for emergency use. The Frontier Emergency Water Filter System is a small portable system that uses a carbon filter in conjunction with a drink straw so a user can connect the straw to the filter and place one end of the filter in a water source. The user then suctions water from the source via the straw, filtering the water through the carbon filter on its way from the source to the user.

BRIEF SUMMARY OF THE INVENTION

The present invention is an improved portable filter and a filter system. The filter is preferably sized and formed to be handheld and has a mouthpiece mechanically associated with a filter housing at its dispensing. One or more liquid receiving members, preferably two or more, are connected to a filter housing at the inlet to the filter housing. The filter preferably also includes a pre-filter assembly of which the liquid receiving members can be a part. The filter can be combined with a liquid container to form a portable filter system. The container is preferably a flexible bladder having a strap with a connector to connect the filtration device to the bladder.

Accordingly, a first example embodiment of the invention is a portable filter. The filter preferably includes a filter housing having an inlet and an outlet and a channel for communicating liquid from the inlet to the outlet. The filter housing is formed and sized to be hand held. The portable filter also includes a first filter, for example a carbon block filter, positioned in the channel of the filter housing and configured to filter liquid passing through the channel, a liquid receiving means connectable to the inlet of the filter housing, the liquid receiving means being configured to receive liquid from a source and transmit the liquid to the channel, and a mouthpiece connected to the outlet of the filter housing to extend substantially rigidly away therefrom.

The filter also includes mouthpiece being configured to receive liquid from the channel through the outlet, the mouthpiece being configured for placement into and to transmit the liquid into the mouth of a user. The mouthpiece preferably includes a valve operable between an open position for passing liquid through the valve and a closed position inhibiting the passage of liquid through the valve. For example, the valve may be a bite valve operable by the user biting on it place it in the open position or a push-pull valve.

The liquid receiving means is preferably: a tube connector formed and sized to connect to flexible tubing having a lumen, the tube connector having an internal conduit in fluid communication with the channel and formed to receive liquid from an external source via the tubing lumen and to transmit the liquid to the channel, and a first mechanical connector attached to the filter housing and formed to mechanically connect to a second mechanical connector associated with an exterior source of liquid, the first mechanical connector defining a plenum to receive liquid from the exterior source and transmit liquid from the plenum into the tube connector, the tube connector extending into the plenum. The mechanical connectors are preferably threaded connectors.

A pre-filter assembly can be connected to the inlet of the filter housing. In this embodiment the liquid receiving means can be molded as a part of the pre-filter assembly.

Another example embodiment of the invention is a hydration system. The system generally includes: a source of liquid for hydrating a user, the source including a source inlet for supplying liquid to the source and a source outlet for communicating liquid out of the source; transfer means connectable to the source outlet for transferring liquid from the outlet; a portable filter connectable to the transfer means to receive liquid therefrom, the portable filter including: a filter housing having an inlet and an outlet and a channel for communicating liquid from the inlet to the outlet, the filter housing being formed and sized to be hand held, a first filter positioned in the channel of the filter housing and configured to filter liquid passing through the channel, liquid receiving means at the filter housing, the liquid receiving means being connectable to the transfer means; and a mouthpiece mechanically connected to the outlet of the filter housing to extend substantially rigidly away therefrom, the mouthpiece being configured to receive liquid from the channel through the outlet, the mouthpiece being configured for placement into and to transmit the liquid into the mouth of a user.

The transfer means may be a connection member mechanically associated with the source outlet such that the liquid receiving means is connectable directly to the source outlet.

As with the previous embodiment, the liquid receiving means is preferably: a tube connector formed and sized to connect to flexible tubing having a lumen, the tube connector having an internal conduit in fluid communication with the channel and formed to receive liquid from an external source via the tubing lumen and to transmit the liquid to the channel, and a first mechanical connector attached to the filter housing and formed to mechanically connect to a second mechanical connector associated with an exterior source of liquid, the first mechanical connector defining a plenum to receive liquid from the exterior source and transmit liquid from the plenum into the tube connector, the tube connector extending into the plenum. The mechanical connectors are preferably threaded connectors.

Another example embodiment of the invention is a portable filter having: a filter housing having an inlet and an outlet and a channel for communicating liquid from the inlet to the outlet, the filter housing being formed and sized to be hand held, a first filter media positioned in the channel of the filter housing and configured to filter liquid passing through the channel, a pre-filter assembly connected to the filter housing, the pre-filter assembly including a pre-filter housing member, a pre-filter housed in the pre-filter housing member, a tube connector connected to the pre-filter assembly and being formed and sized to connect to flexible tubing having a lumen, the tube connector having an internal conduit in fluid communication with the channel and formed to receive liquid from an external source via the tubing lumen and to transmit the liquid to the channel, and a first threaded connector connected to the pre-filter assembly and formed to threadedly connect to a second threaded connector associated with an exterior source of liquid, the first threaded connector defining a plenum into which the tube connector extends to receive liquid from the exterior source and transmit and liquid from the plenum into the tube connector.

Yet another example embodiment of the invention is a portable filter system having a portable filter and a container. The portable filter can be a filter as described above or as otherwise known in the art. The container is formed of a liquid tight material and includes: wall means for defining a volume to contain matter, a aperture positioned in the wall means for passing matter into and out of the volume, the aperture having second connection means for connection to the first connection means, and a first attachment means for attaching the container to the filter.

The container can be a flexible bladder and includes a strap having first and second ends, the strap being connected to the bladder at the first end and having a second attachment means at the second end, the strap having a length to extend around the filter and the rolled bladder when the filter and the rolled bladder are place adjacent to one another and to connect with the first attachment means and thereby secure the flexible bladder to the filter assembly.

In another embodiment the container can be a flexible bladder that is positional between a closed position where the wall means collapse to opposing laminar surfaces when liquid is not in the bladder and a full position wherein the wall means separate to form the volume when liquid is in the bladder and, the bladder further including: an aperture configured perpendicular to a plane defined by the opposing laminar surfaces, the bladder having closure means for adjusting the opening between: an open position for the passage of matter into the volume as the bladder is moved through a liquid source in a direction perpendicular to the wall means, and a sealed position for retaining liquid in the bladder to inhibit the movement of matter out of the volume.

The bladder can include a scooping member, the scooping member being sized and shaped to direct liquid from a separate source into the bladder upon movement of the scooping member.

The container can also be a rigid container such as a water bottle.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7A illustrates a first perspective view of an end cap for use in a portable filter according to the invention, FIG. 7B illustrates another perspective view of an end cap for use in a portable filter according to the invention.

DETAILED DESCRIPTION OF THE PREFERRED EMBODIMENTS

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of filtration systems have not been described in particular detail in order to avoid unnecessarily obscuring the present invention.

Figure 1:
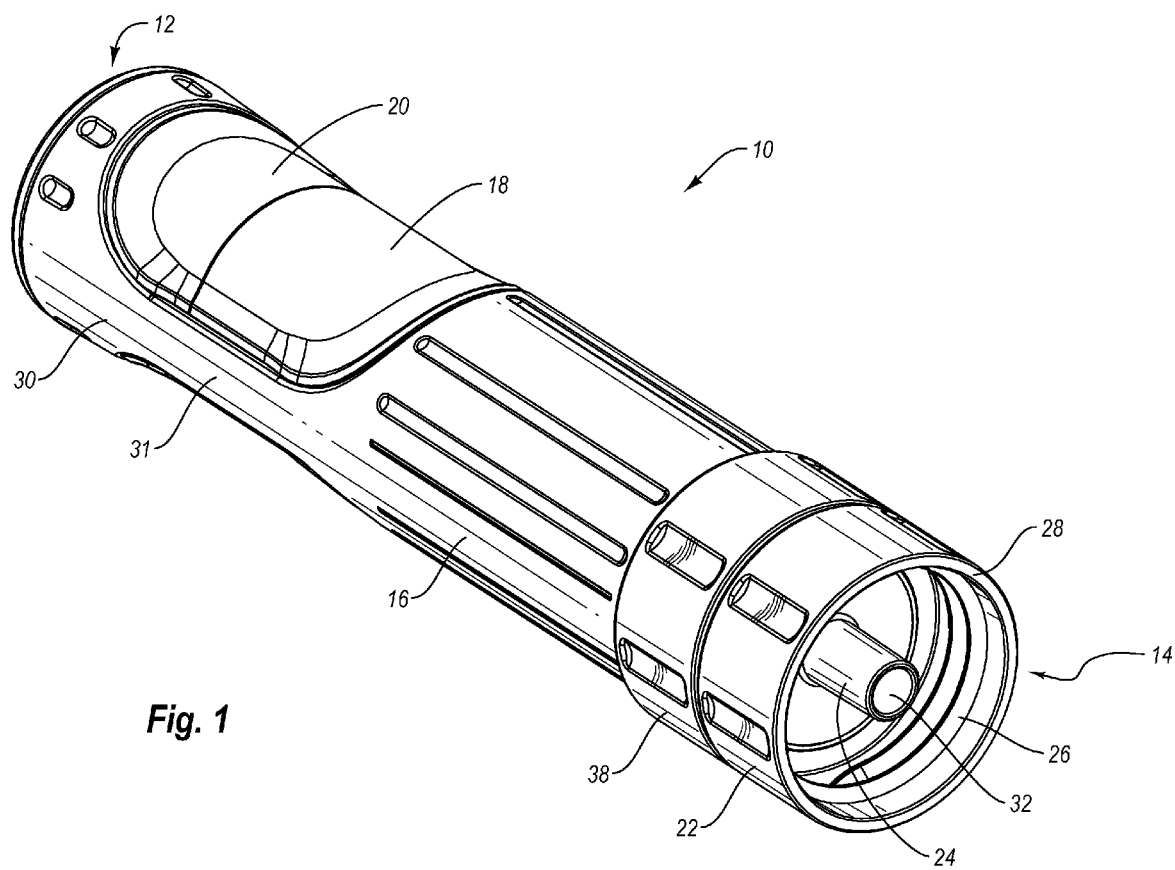
FIG. 1 illustrates a portable filter according to the invention.
Figure 2:
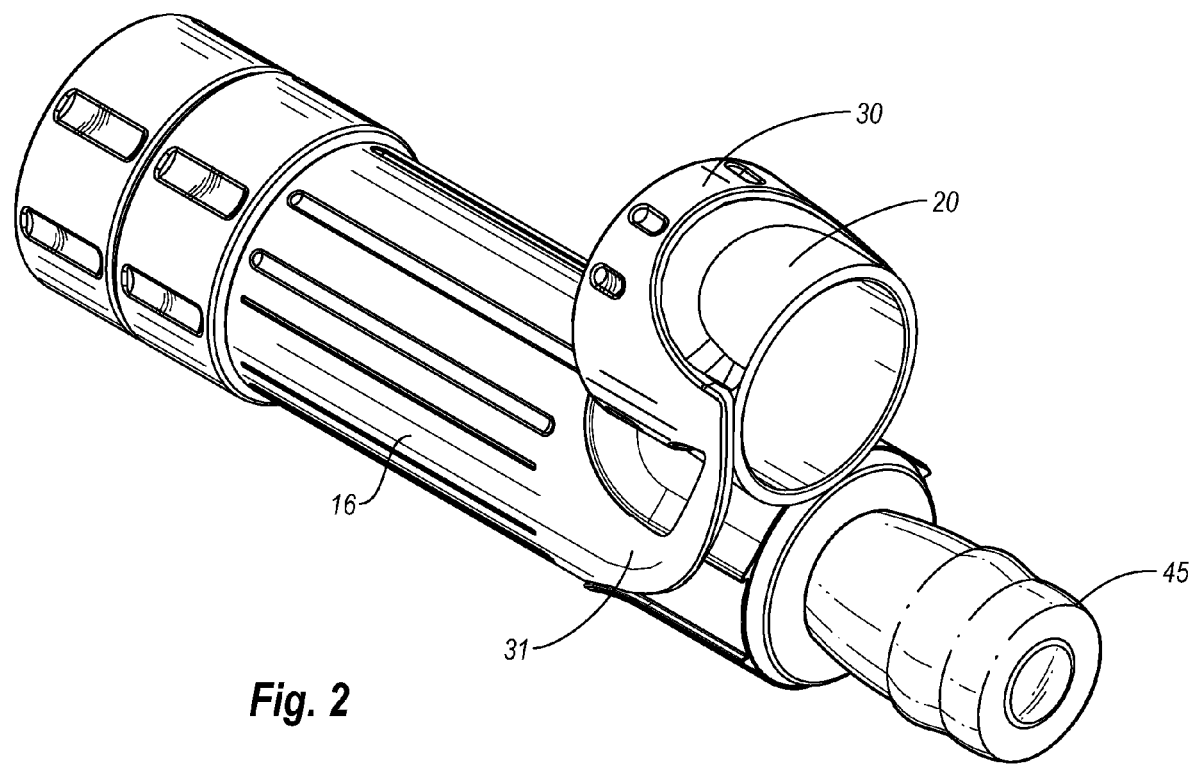
FIG. 2 illustrates a portable filter according to the invention wherein a mouthpiece cap has been removed to permit access to the mouthpiece.

With reference now to FIG. 1 and FIG. 2, FIG. 1 illustrates a portable filter 10 according to the invention. The filter is preferably formed and sized to be hand held and portable. Filter 10 operates by filtering liquid passing through it from inlet 14, particularly from opening 32 in this embodiment, to dispensing end 12, from where a user can withdraw a liquid from a mouthpiece 45. More particularly, a user can hold the portable filter 10 at grip member 16, connect the inlet 14 to a liquid source, remove cap 20 as described below and illustrated in FIG. 2, and suction or otherwise receive liquid that enters opening 32 and is filtered by filter 10. One significant advantage of preferred embodiments of the invention is that, unlike many conventional filters, the inventive filters can work by user suction and therefore include no levers or pumps that are bulky and heavy and tend to fail.

Figure 3:
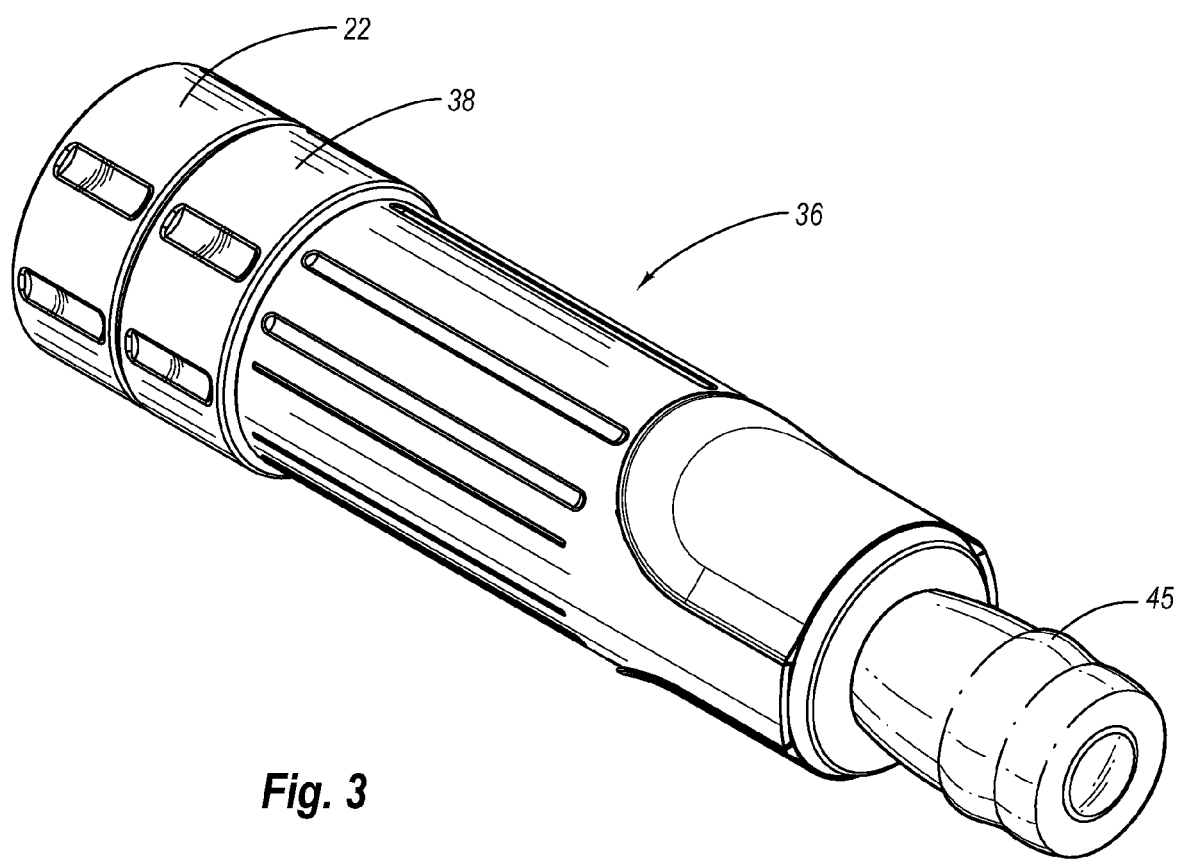
FIG. 3 illustrates a portable filter according to the invention that does not use a mouthpiece cap.

In FIGS. 1 and 2 an elastic grip member 16 is shown connected to filter housing 18 and cap 20. Grip member 16 elastically holds cap 20 in place to keep mouthpiece 45 covered and clean when not the device is not in use. Because grip member 16 is elastic and connects to cap 20 by cap portion 30 and connection portion 31, it can extend to allow cap 20 to be removed without entirely separating the cap from the rest of the device, as illustrated in FIG. 2. Grip member 16 can be formed of a variety of known elastic materials to improve the user's handling of the filter and permit the controlled removal of the cap. Of course, a variety of other cap systems, such as threaded or snap caps, can be used to connect the cap to the filter. The cap can also be omitted altogether as illustrated with filter 36 in FIG. 3. As seen in FIG. 3, the connection portion 31 can include several elastic members, for example 2, so that the removal of the cap from over the mouthpiece keeps the cap close to the body of the filter.

Figure 4:
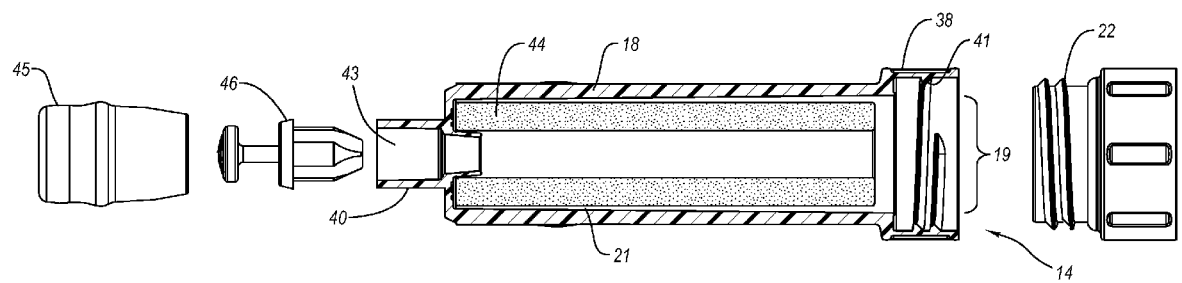
FIG. 4 illustrates a partial cross sectional view of a portion of a portable filter according to the invention.

With reference now to FIG. 4, a sectional view of an example filter is presented. A mouthpiece 45 is mechanically associated, preferably substantially rigidly and directly connected, with the dispensing end of the filter housing 18. In this embodiment the filter housing includes a connected or monolithically molded receiver 40 at its outlet 43 to which the mouthpiece 45 is directly connected through a connecting member on valve insert 46. The mouthpiece in this example is thus a bite valve with a mouth portion and a valve insert. The bite valve is sized to position in the mouth and function so that as a user bites thereon, it moves from a closed position toward an open position. The user can thereby press on the mouthpiece 45 and such to create a vacuum to pull liquid through the bite valve into the user's mouth. Any suitable bite valve can be used.

More generally, as the mouthpiece is a device to dispense liquid into the mouth of a user, any valve suitable for this purpose, for example a push-pull valve can be used. In other embodiments a valve may be omitted in favor of an open connection. Regardless, filter 10 is preferably sealed from the liquid receiving means to the mouthpiece 45 sufficiently for a user to suction liquid from the liquid receiving means, through the filter, and into the mouthpiece. Alternatively a liquid force can be applied from the opposing end, for example by direct pressure, gravity or pump, to push liquid through the filter.

The filter housing 18 is preferably a rigid monolithic material having an inlet and an outlet 43 at receiver 40 as previously noted. The filter housing 18 defines a channel 19 for communicating liquid from the inlet 14 to the outlet 43. A first filter media 44 is positioned in the channel 19 of the filter housing 18 and configured to filter all liquid passing through the channel 19. In the depicted embodiment, liquid will pass along a space 21 between the filter housing 18 and the filter media 44 and thereby filter through the filter media 44 along the lateral surfaces of the filter media and maximize the filter efficiency in a handheld portable filter. By way of example only, the filter media 44 can be a solid carbon block filter media.

Figure 5:
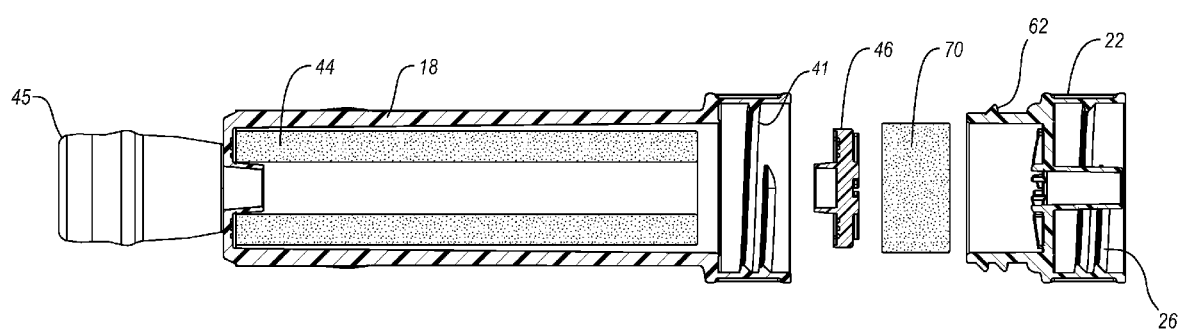
FIG. 5 is another sectional view of a portion of a portable filter according to the invention.
Figures 6A, 6B:
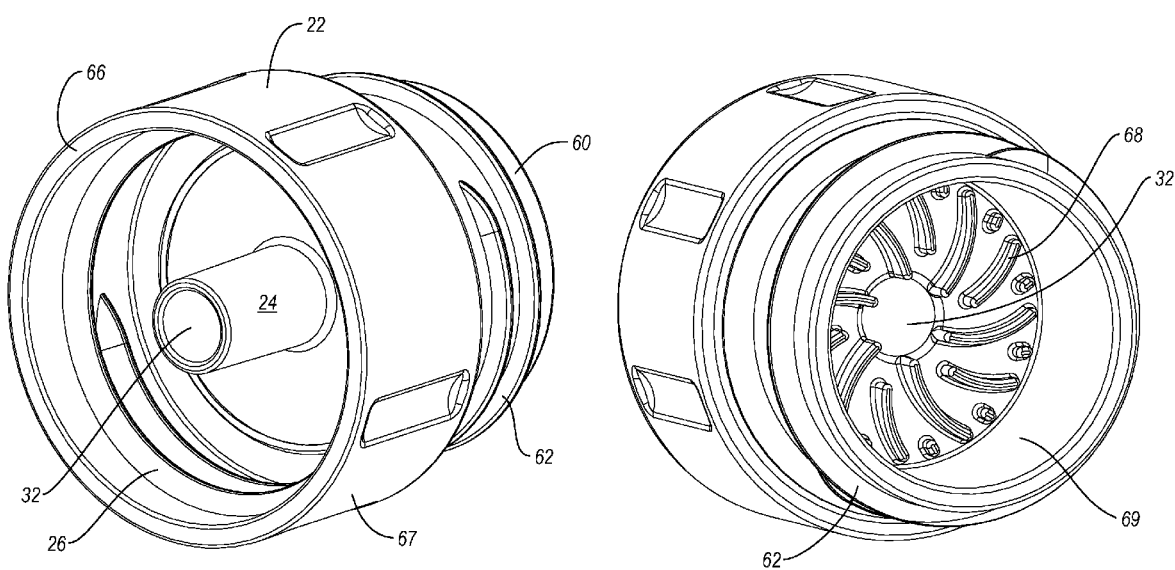
FIG. 6A illustrates a first perspective view of a pre-filter assembly for use in a portable filter according to the invention.
FIG. 6B illustrates another perspective view of a pre-filter assembly for use in a portable filter according to the invention.

A filter housing connecting member 38 with an attachment means, in the illustrated case screw threads 41, is used for connecting filter housing 18 to other filter members or assemblies. For example, as illustrated in FIGS. 5, 6A and 6B, filter housing 18 can connect to a pre-filter adapter 22 which can be used to house and provide use of a pre-filter 70. The pre-filter adapter 22 is thus connected at the inlet 14 of the filter housing 18. As with filter housing connecting member 38, pre-filter adapter 22 includes an attachment means, in the illustrated embodiment screw threads 62, for connection to the filter housing 18. The pre-filter adapter 22 in turn can also be used to connect yet additional assemblies with another mechanical connection, in the illustrated embodiment screw threads 26, for connection to the filter housing 18. The pre-filter adapter 22 can thereby be an intermediate assembly by attaching to filter housing connecting member 38 with screw threads 62 on attachment member 60 and attaching to other devices with screw threads 26.

With reference to FIG. 6B, the pre-filter assembly 22 has a pre-filter housing 69 forming a plenum to house pre-filter media 70. On at least one surface of the housing a plurality of guide vanes 68 are used to spread received liquid and thus improve liquid distribution from opening 32 over the surface of the pre-filter 70.

Figure 8:
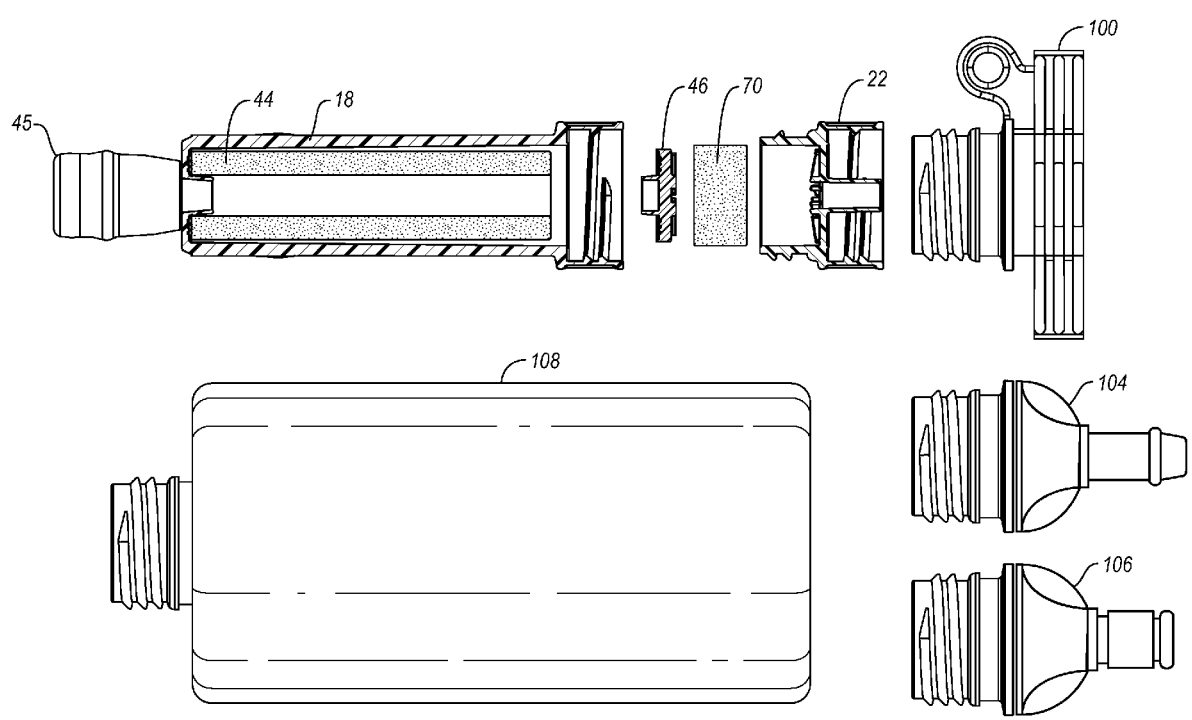
FIG. 8 illustrates the attachment of various devices to a connector on the filter according to another embodiment of the invention.

Referring again to FIGS. 1 and 6A, the invention provides for a plurality of liquid receiving means mechanically associated with the receiving end 14 of the filter 10 for receiving liquid from a remote source and transmit the liquid to the channel 19. A receiving means is any structure which facilitates liquid to enter the filter. For example and as previously discussed, the screw threads and accompanying walls provide an attachment to other devices such as a reservoir, however, with mating thread or adapters. As illustrated in FIG. 8, examples of such other device or adapters include a 28mm adapter 100, such as those used to weld into the seam of a flexible hydration reservoir, a hose adapter 104, a quick connect assembly 106 as is known in the art, and a water bottle 108. The screw threads 26 may also connect to a compatible flexible container 152 as illustrated and discussed in conjunction with FIGS. 10 and 11 below.

The liquid receiving means of the inventive filter also can include a tube connector 24 with a channel or opening 32 therethrough. The tube connector 24 is formed and sized to form secure connection to flexible tubing and is therefore not necessarily limited to the tubular shape depicted. Such tubing is known in the art and can include any suitable flexible tubing made from a substance that does not chemically interact with the various liquids that may be used. Polyethylene tubing, vinyl tubing, or any other flexible plastic-like or rubber-like tubing are common examples. The tube connector in some embodiments may have a barbed edge (not illustrated) to snugly receive the proximal end of the tube and improve the connection. Preferable tubing has a side wall that is deformable to facilitate the connection to the tube connector 24.

In addition to or in lieu of tube connector a quick connect assembly can used as a liquid receiving means. Such assemblies are known in the art and new versions are in fact consistently being developed. Those skilled in the are will appreciate, in view of the disclosure herein, how to form a filter using a suitable quick connect assembly.

In addition, as shown in FIGS. 6A and 6B, a continuous outer member 67 can be formed and sized to have a brim 66 forming a water tight seal along the brim when the brim is inserted completely in a liquid source. Thus, a user can submerge the end of the filter 10, particular brim 66, into a water source such a lake or stream and intake the liquid to an opening such as opening 32. The rim of tube connector 24 may also be used for this purpose.

Preferably, at least two liquid receiving means are used in embodiments of the invention. Still more preferably at least three liquid receiving means are used. With the possible exception of portions of a quick connect assembly, the liquid receiving means are preferably monolithically molded parts of the pre-filter assembly.

With reference to FIGS. 7A and 7B, a filter end cap 46 is preferably disposed between the first filter media 44 and the pre-filter 70. A plurality of guide vanes 48 serve to receive liquid from pre filter 70 and spread liquid to the sides of filter media 44. Protruding member 52 preferable mates with a corresponding receiving portion on filter media 44 and edge members 50 space the end cap 46 to the walls of filter housing 18 so that protruding member 52 and edge member 50 can be used to precisely align first filter media 44 with respect to filter housing 18 to maintain space 21.

Figure 9:
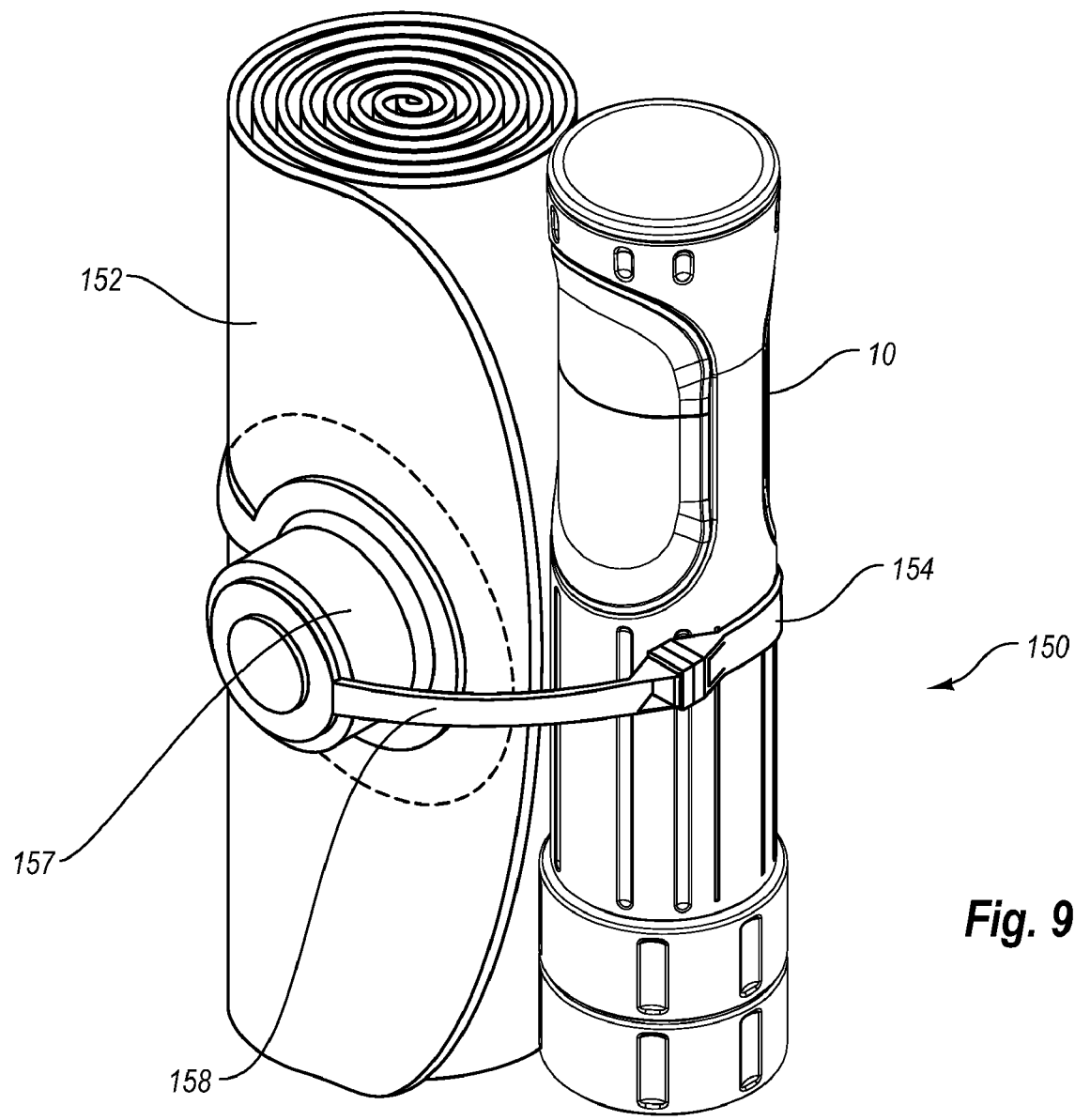
FIG. 9 illustrates a portable filter system including a filter and a liquid container according to the invention.
Figure 10:
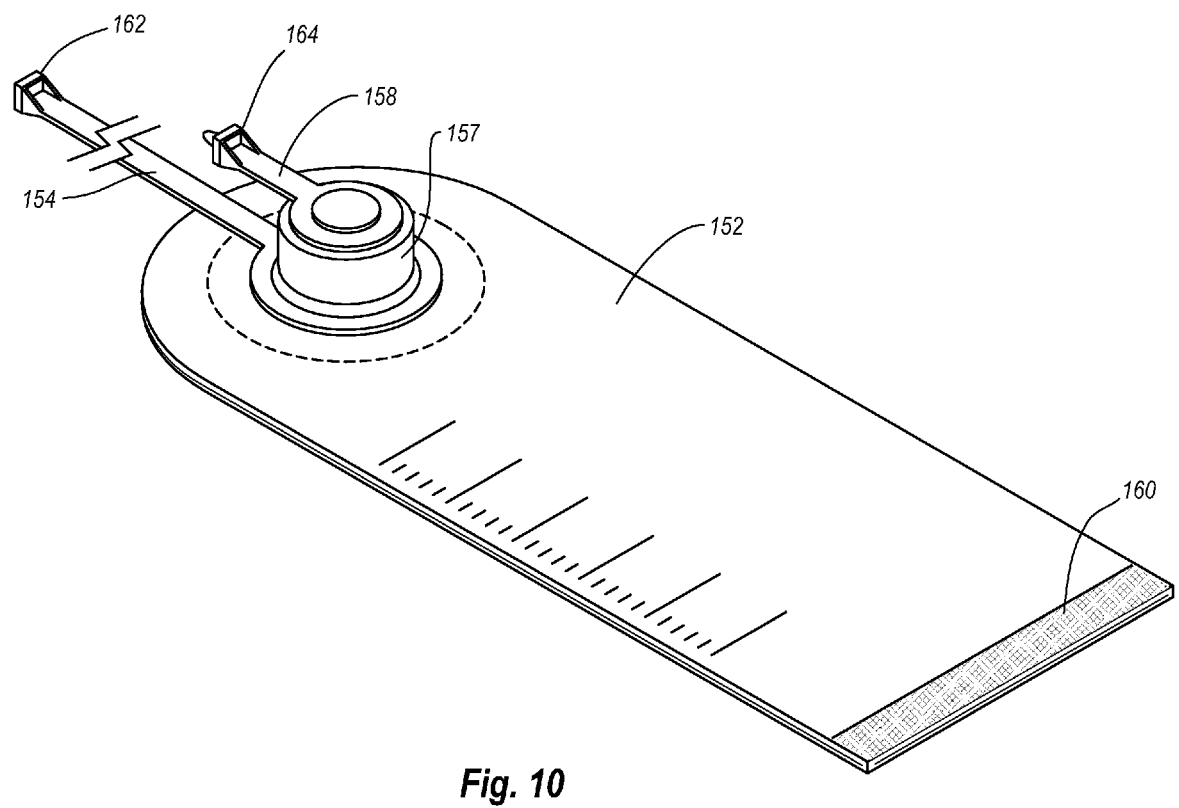
FIG. 10 illustrates a flexible bladder for use with filter systems according to the present invention.

With reference now to FIGS. 9 and 10, another aspect of the invention is a portable filter system 150 that includes a filter 10 and a source of liquid such as liquid container 152. The filter 10 and the liquid container 152 are preferably formed to be compatibly carried together preferably joined by attachment means, which as defined herein means one or more straps (e.g. strap members 154, 158), Velcro, snaps, or other common attachment means that would serve to secure the filter 10 the container 152 for travel. The filter can be configured and formed according to any of the embodiments mentioned hereinabove. The filter can also be other conventional or later developed filters that are sized and shaped to be handheld and used with the containers and systems as disclosed herein.

The system 150 is sized to be carried by a user in any convenient manner. In one known arrangement, the container system is positioned in a survival vest pocket. Alternately, the system 150 may be suspended around the user's waist by a belt or carried in a purse-like arrangement having a supporting strap over one shoulder. Any suitable arrangement can be used to transport the system 150 on the person of a user or on some other structure, such as a pack, suitably available to a user when desired.

The container may be made of a soft plastic material such as low density polyethylene or poly urethane material or of a semi-rigid material like existing sport bottles or PTFE bottles presently used to contain water, sport drinks, and the like, although a flexible bladder is preferred. The container 152 includes wall means for defining a volume to contain matter such as liquid and an inlet and an outlet positioned in the wall means for passing liquid into and out of the container. The inlet and the outlet may in some embodiments be the same opening, such as the mouth of a water bottle. The wall means may be made of a material such as low density polyethylene or poly urethane and may include a variety of rigid or flexible water tight materials that are chemically suitable for transporting consumable liquids. The container is preferably a flexible bladder, for example wherein the wall means can be a tube or sleeve with opposite ends or a pair of separate layers sealed together around a periphery as is known in the art.

The volume of the container 152 is selected to provide the user with a desired or suitable quantity of a desired liquid. By way of example, sizes may vary from 0.5 liter to several liters. The wall of the container 152 is made of a durable thick plastic that may be as much as 0.5 mm to reliably contain the desired liquid while the user is walking, jogging or the like. That is, the wall is selected of a material that resists punctures. Low density polyethylene or poly urethane of the specified thickness has been found to be one suitable material for the wall that withstands the forces identified. Because of the portable nature, and optionally emergency only use, of the system 150, however, it may preferable in some embodiments to minimize the wall thickness.

The container 152 has a mouth (not illustrated) for receiving and dispensing material. A cap 157 is also sized to fit on the mouth and is positionable between a closed position in which the cap is positioned on the mouth to inhibit the movement of the matter into and out of the volume and an open position in which the cap is removed from the mouth for the movement of matter therethrough. The mouth preferably has a transfer means for securely connecting both to the cap 157 as well as to the liquid receiving means on the filter 10 for passage of liquid from the outlet of the container to the filter. Such connection means is preferably mechanical connector such as a threaded connector that is compatible with screw threads 26. When in use, a user can connect the filter 10 to the filled container 152 and drink liquid from the container through the filter 10.

In a preferred embodiment and as illustrated in the figures, the first strap member 154 and second strap member 158 are attached to container 152 at the mouth for ease of operation and to reduce the number of required parts. A first strap member 154 can be attached to the container 152 adjacent to or connected to the mouth connection means and a second strap member 158 can be attached to the cap 157. The first strap member 154 and second strap member 158 can then securely connect at strap connectors 162, 164, which can be of any of the many connector forms known in the art, for example snaps, clips, Velcro, and the like. Alternatively, only one strap can be used and the system can be configured so the single strap connects at a opposing ends to the cap and to the bladder. Such a single strap can be removably connectable at either end or permanently fixed at both ends. In the permanently fixed embodiment, the removable connection of the cap 157 to the container 152 can be used to alternately secure and release the strap around the filter and container.

In another embodiment a strap is formed integrally, preferably monolithic with the wall means, with a flexible bladder. The strap has a ring defining a hole at a distal end. The strap has a length sufficient to extend around the filter 10 to connect the ring to the container. In this embodiment the strap stretches around the filter and bladder so the ring can connect to the mouth or cap and secure the system.

With particular reference now to FIG. 10, in another aspect or embodiment of the invention, the container is a flexible bladder that has an aperture 160 at one end, which is preferably distal to the cap 157 and the corresponding straps. In this embodiment the wall means are preferably flexible materials that collapse to opposing laminar surfaces when liquid is not in the bladder and expand to a full position when liquid is inserted such that the wall means separate to form a volume. The aperture 160 is positioned at a terminus of the container 152 so that the bladder can be passed, or scooped, through a liquid source such as a stream or lake and quickly filled as liquid passes between and spreads opposing laminar walls. In a preferred embodiment the aperture is defined as an unsealed edge section of the opposing laminar walls. Thus, the container 152 in this embodiment is positional between a closed position where aperture 160 is closed to inhibit the movement of liquid out of the volume and an open position where aperture 160 is open for the passage of matter into the volume as the bladder is moved through a liquid source in a direction parallel to the laminar walls.

The container 152 has closure means for adjusting the container, particularly the aperture, between the open position and the closed position. The closure means can be any method or device for closing an opening, for example a sliding closure, a roll an clip closure, an adhesive closure, a cap closure, or any of the other closure devices as are known in the art.

In a preferred embodiment the container 152 is a flexible bladder that is rolled before attachment to the filter 10, although this is not necessarily the case as container 152 may be folded, crumpled, coiled around filter 10, or otherwise compactly configured as will be apparent to those skilled in the art in view of the disclosure herein. In each of these embodiments a strap can be used to secure the container 152 to the filter.

As used in the claims, the term "connect," "connectable," or "connected to" are not necessarily limited to a direct connection. In some embodiments of the invention members described with the terms "connect," "connectable," or "connected to" may in fact be monolithic structures. In other embodiments intermediate structures or materials may be disposed between the connected members. The context is useful in determining the intent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable filter comprising:
    a filter housing having an inlet and an outlet and a channel for communicating a liquid from said inlet to said outlet, said filter housing being formed and sized to be grasped in and held in a palm of and by one hand of a user during use;
    a first filter positioned in said channel of said filter housing and configured to filter said liquid passing through said channel;
    a liquid receiving means connectable to said inlet of said filter housing, said liquid receiving means being configured to receive said liquid from a source separate from said filter housing and to transmit said liquid to said channel through said inlet;
    a bite valve having a receiver formed with and extending from said filter housing as the outlet thereof to extend substantially rigidly away from said filter housing, said bite valve being configured to receive said liquid from said channel, said bite valve being configured to place into a mouth of said user, said bite valve being operable by said user biting on said bite valve to operate it between an open position for passing said liquid through said bite valve to transmit said liquid into said user's mouth and a closed position inhibiting the passage of said liquid through said bite valve;
    a pre-filter assembly connected to said inlet of said filter housing and housing a pre-filter, said liquid receiving means comprising at least one molded section of the pre-filter assembly;
    a filter end cap disposed between said first filter and said pre-filter assembly, said filter end cap including a first plurality of guide vanes configured to receive said liquid from said pre-filter assembly and spread said liquid to a space between said first filter and said filter housing; and,
    wherein said first filter is sealed from said liquid receiving means to said bite valve, said user generating a suction with said mouth on said bite valve when said bite valve is in said open position to suction said liquid from said liquid receiving means through said first filter and into said bite valve.

2. The portable filter of claim 1, wherein said liquid receiving means comprises:
    a tube connector formed and sized to connect to a flexible tubing having a lumen, said tube connector having an internal conduit in fluid communication with said channel and formed to receive said liquid from said source via said lumen and to transmit said liquid to said channel; and,
    a first mechanical connector attached to said filter housing and formed to mechanically connect to a second mechanical connector associated with said source of said liquid, said second mechanical connector defining a plenum to receive liquid from said source and transmit said liquid from said plenum into said tube connector, said tube connector extending into said plenum.

3. The portable filter of claim 2, wherein said first mechanical connector comprises a first threaded connector and said second mechanical connector comprises a second threaded connector that is connectable with said first threaded connector.

4. The portable filter of claim 2, wherein said second mechanical connector includes a thread wall which is impermeable and which defines an opening into said plenum.

5. The portable filter of claim 1, wherein the pre-filter assembly has a downstream surface adjacent said pre-filter, said downstream surface including a second plurality of guide vanes extending away from said downstream surface and configured to enhance distribution of said liquid over said downstream surface of said pre-filter.

6. The portable filter of claim 1, wherein said first filter is a carbon block filter.

7. A portable filter comprising:
    a filter housing having an inlet and an outlet and a channel for communicating a liquid from said inlet to said outlet, said filter housing being formed and sized to be grasped in and held in a palm of and by one hand of a user during use;
    a first filter positioned in said channel of said filter housing and configured to filter said liquid passing through said channel;
    a pre-filter assembly attached to said filter housing, said pre-filter assembly comprising:
    a pre-filter housing member;
    a tube connector, said tube connector being formed and sized to connect to a flexible tubing having a lumen, said tube connector having an internal conduit in fluid communication with said channel and formed to receive said liquid from an external source via said lumen and to transmit said liquid to said channel;
    a first threaded connector, said first threaded connector being formed to threadedly connect to a second threaded connector associated with said external source of said liquid, said second threaded connector defining a plenum into which said tube connector extends to receive said liquid from said external source and transmit said liquid from said plenum into said tube connector;
    a pre-filter housed in said pre-filter housing member, said pre-filter being configured to filter said liquid received in said tube connector before said liquid is passed to said channel; and,
    a filter end cap disposed between said first filter and said pre-filter assembly, said filter end cap including a first plurality of guide vanes configured to receive said liquid from said pre-filter assembly and spread said liquid to a space between said first filter and said filter housing.

8. The portable filter of claim 7, wherein said portable filter further comprises a mouthpiece connected to said outlet of said filter housing to extend substantially rigidly away therefrom, said mouthpiece being configured to receive said liquid from said channel through said outlet, said mouthpiece being configured for placement into and for transmitting said liquid into a mouth of said user.

9. A portable filter comprising:
    a filter housing having an inlet and an outlet and a channel for communicating a liquid from said inlet to said outlet, said filter housing being formed and sized to be grasped in and held in a palm of and by one hand of a user during use;

a first filter positioned in said channel of said filter housing and configured to filter said liquid passing through said channel;

a liquid receiving means connected to said filter housing, said liquid receiving means being connectable to an external transfer means to receive said liquid therefrom and to supply said liquid to said inlet;

a bite valve mechanically connected to said outlet of said filter housing to extend substantially rigidly away therefrom and to receive said liquid therefrom, said bite valve being configured for placement into and for transmitting said liquid into a mouth of said user, and said bite valve being operable by said user biting on said bite valve to operate it between an open position for passing said liquid through said bite valve to transmit said liquid into said user's mouth and a closed position inhibiting the passage of said liquid through said bite valve;

a cap positionable over said bite valve; and, an elastic grip formed from an elastically deformable material, said elastic grip comprising:

a grip portion positioned over at least a portion of said filter housing and configured to facilitate grasping of said portable filter by said user; and, a connection portion connecting said grip portion to said cap; and, a filter end cap disposed between said first filter and a pre-filter assembly, said pre-filter assembly connected to said inlet, said filter end cap including a first plurality of guide vanes configured to receive said liquid from said pre-filter assembly and spread said liquid to a space between said first filter and said filter housing.

10. The portable filter of claim 9, wherein said liquid receiving means comprises a first threaded connector and said transfer means comprises a second threaded connector that is connectable with said first threaded connector.

11. A system comprising:

a filter housing having an inlet and an outlet and a channel for communicating a liquid from said inlet to said outlet, said filter housing being formed and sized to be grasped in and held in a palm of and by one hand of a user during use;

a first filter positioned in said channel of said filter housing and configured to filter said liquid passing through said channel;

a liquid receiving means connected to said filter housing, said liquid receiving means being connectable to an external source to receive said liquid therefrom and to supply said liquid to said inlet, said liquid receiving means having a tube connector formed and sized to connect to a flexible tubing having a lumen, said tube connector having an internal conduit in fluid communication with said channel and formed to receive said liquid from said external source via said lumen and to transmit said liquid to said channel;

a first mechanical connector attached to said filter housing and formed to mechanically connect to a second mechanical connector associated with said external source of said liquid, said second mechanical connector defining a plenum into which said tube connector extends to receive said liquid from said external source and transmit said liquid from said plenum into said tube connector;

a bite valve having a receiver formed with and extending substantially rigidly away from said filter housing said bite valve being configured to receive said liquid from said channel, said bite valve being configured for placement into and for transmitting said liquid into a mouth of said user;

a cap sized for positioning over said bite valve, said cap being movable between a covered position over said bite valve and an uncovered position in which said cap is removed from said bite valve; and, a grip formed from an elastically deformable material positioned over at least a portion of said filter housing for grasping by said user, and a connection portion connected to said cap to retain said cap proximate said filter housing when said cap is in said uncovered position;

wherein said first filter is sealed from said liquid receiving means to said bite valve, said user generating a suction with said mouth on said bite valve to suction said liquid from said liquid receiving means through said first filter and into said bite valve; and, a filter end cap disposed between said first mechanical connector and said second mechanical connector, said filter end cap including a plurality of guide vanes.

12. The system of claim 11 wherein said external source is a container having wall means for defining a volume to contain said liquid, said container being operable between a stored position in which said wall means are in a collapsed position and a deployed position in which said wall means are positioned to receive said liquid in said volume.

13. The system of claim 12, wherein said container is a flexible bladder including a container outlet and a container cap at said container outlet operable between a closed position in which said container outlet is covered by said container cap and an open position in which said container cap is removed from said container outlet; and wherein said container cap further comprises a first strap member for connection to said flexible bladder and a second strap member connected to said container cap, said first strap member having a first length and a first connector, and said second strap member having a second length and a second connector, said first length and said second length having a combined length sufficient to extend around said filter housing and said container to connect said first connector and said second connector to connect said container and said filter housing with one another when said container is in said stored position and placed adjacent to said filter housing .

14. The system of claim 13, wherein said wall means includes opposing surfaces in contact when said liquid is not in said flexible bladder, said flexible bladder further comprising:

an aperture in one of said opposing surfaces, closure means for opening and closing said aperture, said closure means being operable between an open position for the passage of said liquid into said volume, and a closed position for retaining said liquid in said flexible bladder.

15. The system of claim 14, further comprising a pre-filter assembly connected to said filter housing and a pre-filter housed in said pre-filter assembly.

16. The system of claim 12, further comprising an adapter having an adapter inlet, an adapter outlet, and an adapter channel therethrough, said adapter being connectable to said liquid receiving means at said adapter outlet, connectable to a remote liquid source that is not connectable to said liquid receiving means at said adapter inlet, and formed to pass said liquid from said remote liquid source, through said adapter channel and into said liquid receiving means.

17. The portable filter of claim 1, further comprising:

a cap positionable over said bite valve; and, an elastic grip comprising:

a grip portion positioned over at least a portion of said filter housing;

a cap portion connected to said cap; and, a connection portion connecting said grip portion to said cap portion, said elastic grip formed of a material having an elasticity permitting said cap to be selectively removed from or placed over said bite valve to permit access to said bite valve by said user without separating said bite valve from said portable filter.

18. The portable filter of claim 9, wherein said connection portion comprises two elastic members extending from said grip portion to said cap portion.

19. A portable filter comprising:

a filter housing having an inlet and an outlet and a channel for communicating a liquid from said inlet to said outlet, said filter housing being formed and sized to be held in a palm of one hand of a user during use;

a first filter positioned in said channel of said filter housing and configured to filter said liquid passing through said channel;

a liquid receiving means connectable to said inlet of said filter housing, said liquid receiving means being configured to receive said liquid from a source separate from said filter housing and to transmit said liquid to said channel through said inlet; and, a bite valve having a receiver formed with and extending from said filter housing at said outlet thereof to extend substantially rigidly away from said filter housing, said bite valve being configured to receive said liquid from said channel, said bite valve being configured for placement into and for transmitting said liquid into a mouth of said user, and said bite valve being operable by said user biting on said bite valve to operate said bite valve between an open position in which said liquid passes therethrough into said mouth of said user and a closed position in which said transmitting of said liquid through said bite valve is inhibited;

a cap sized for positioning over said bite valve, said cap being movable between a cover position over said bite valve and an uncovered position in which said cap is removed from said bite valve; and a grip formed from an elastically deformable material positioned over at least a portion of said filter housing for grasping by the fingers of said user, and a connection portion connected to said cap to retain said cap proximate said filter housing when said cap is in said uncovered position; and, a filter end cap disposed between said first filter and a pre-filter assembly, said pre-filter assembly connected to said inlet, said filter end cap including a first plurality of guide vanes configured to receive said liquid from said pre-filter assembly and spread said liquid to a space between said first filter and said filter housing.

20. A method of obtaining potable water from a source of non-potable water, said method comprising:

providing a portable filter including:

a filter housing having an inlet and an outlet and a channel for communicating a liquid from said inlet to said outlet, said filter housing being formed and sized to be held in a palm of one hand of a user during use;

a first filter positioned in said channel of said filter housing and configured to filter said liquid passing through said channel;

a liquid receiving means connectable to said inlet of said filter housing, said liquid receiving means being configured to receive said liquid from a source of non-potable water separate from said filter housing and to transmit said liquid to said channel through said inlet; and, a bite valve having a receiver formed with and extending from said filter housing at said outlet thereof to extend substantially rigidly away from said filter housing, said bite valve being configured to receive said liquid from said channel, said bite valve being configured for placement into and for transmitting said liquid into a mouth of said user, and said bite valve being operable by said user biting on said bite valve to operate said bite valve between an open position in which said liquid passes therethrough into said mouth of said user and a closed position in which said transmitting of said liquid through said bite valve is inhibited; and, a filter end cap disposed between said first filter and a pre-filter assembly, said pre-filter assembly connected to said inlet, said filter end cap including a first plurality of guide vanes configured to receive said liquid from said pre-filter assembly and spread said liquid to a space between said first filter and said filter housing;

grasping said filter in said palm of said user's hand;

positioning said liquid receiving means in said source of non-potable water;

connecting said liquid receiving means to said inlet of said filter housing;

positioning said mouth of said user over said bite valve;

operating said bite valve to said open position;

sucking on said bite valve to draw said non-potable water from said source through said liquid receiving means, through said first filter and through said bite valve into said mouth of said user.

* * * * *